(12) United States Patent
Fu

(10) Patent No.: US 8,151,711 B1
Fu
(45) Date of Patent: Apr. 10, 2012

(54) SUPERCAVITATING PROJECTILE WITH REDUCED-DRAG CONTROL SURFACES

(75) Inventor: Jyun-Horng Fu, Centreville, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 209 days.

(21) Appl. No.: 12/399,945

(22) Filed: Mar. 7, 2009

(51) Int. Cl.
*F42B 15/22* (2006.01)
*B63H 25/00* (2006.01)

(52) U.S. Cl. .................. 102/399; 114/20.1; 114/23

(58) Field of Classification Search .................. 102/399; 114/330, 331, 332, 21.1, 23, 25; 244/3.24, 244/3.28, 3.29
See application file for complete search history.

(56) References Cited

U.S. PATENT DOCUMENTS

| | | | | |
|---|---|---|---|---|
| 1,879,840 A | * | 9/1932 | Brandt | 244/3.28 |
| 3,041,992 A | * | 7/1962 | Lee | 114/312 |
| 3,205,846 A | * | 9/1965 | Lang | 114/67 A |
| 3,875,885 A | * | 4/1975 | Balquet | 114/67 A |
| 6,684,801 B1 | * | 2/2004 | Kuklinski | 114/67 A |
| 2010/0071605 A1 | * | 3/2010 | Kuklinski | 114/23 |

OTHER PUBLICATIONS

Wang et al., "Analysis of Supercavity Shape for Underwater Projectile With Typical Cavitator", "Journal of Ballistics http://en.cnki.com.cn/Article_en/CJFDTOTAL-DDXB200802031.htm", 2006, Publisher: Tsinghua Tongfang Knowledge Network Techology Co., Ltd. Beijing.

Semenenko, Vladimir N., "Dynamic Processes of Supercavitation and Computer Simulation", "RTO AVT Lecture Series on Supercavitating Flows Brussels, Belgium", Feb. 12-16, 2001, Publisher: RTO EN-010.

Semenenko, Vladimir N., "Prediction of the 2-D Unsteady Supercavity Shapes", "CAV 2001: session B2.006", 2001, pp. 1-8.

Fu, Alex, "Stabilization and Control of Supercavitating Particles Using Umbrellas Conformal to Cavity Geometry", "Exhibit 1", , Publisher: Lockheed Martin Corporation, Published in: US.

* cited by examiner

*Primary Examiner* — Bret Hayes
(74) *Attorney, Agent, or Firm* — DeMont & Breyer, LLC

(57) ABSTRACT

The illustrative embodiment provides bumpers which are roughly shaped like skis that face towards the air-water boundary of the air cavity. When the projectile fishtails and one or more of the bumpers come into contact with the air-water boundary, the water imparts torque and a rebounding force to push the projectile completely back into the air cavity. Furthermore, because the bumpers are shaped roughly like skis and not like knives, the bumpers do not penetrate the water or create unnecessary water drag.

19 Claims, 5 Drawing Sheets

Supercavitating Projectile 200

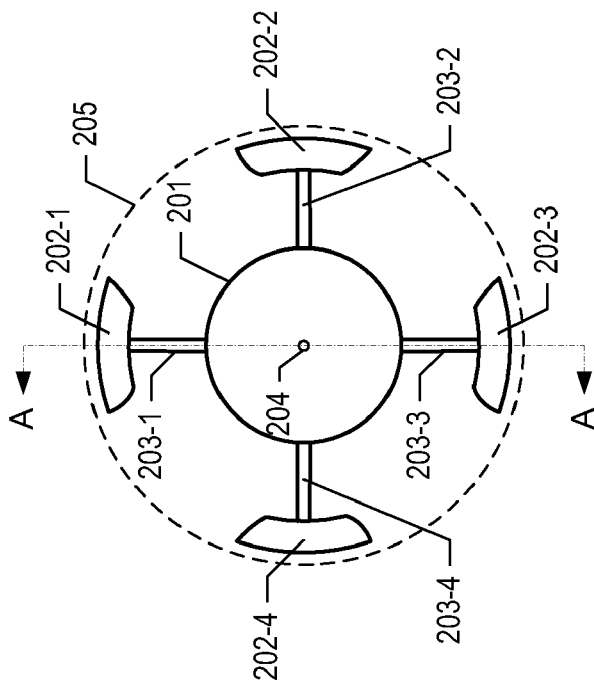
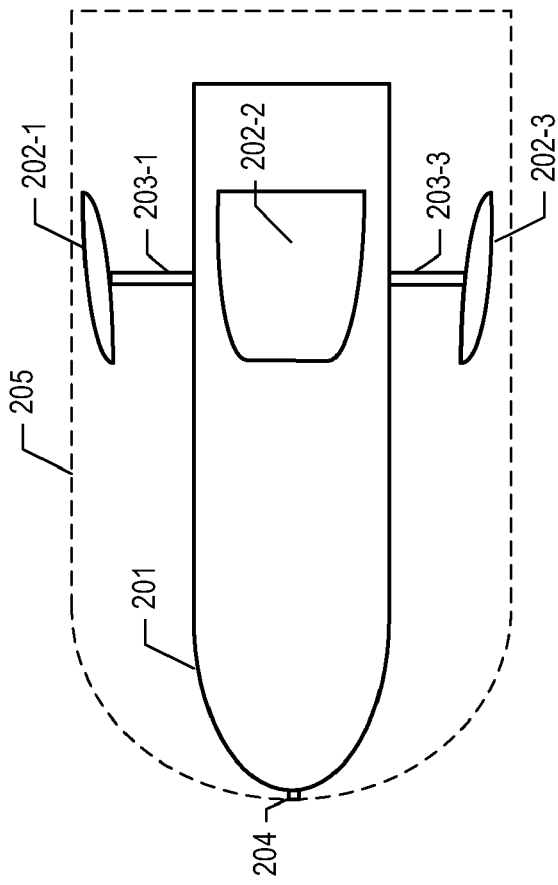
Figure 2A / Figure 2B
Supercavitating Projectile 200

SUPERCAVITATING PROJECTILE WITH REDUCED-DRAG CONTROL SURFACES

FIELD OF THE INVENTION

The present invention relates to supercavitating projectiles in general, and, more particularly, to control surfaces for supercavitating projectiles.

BACKGROUND OF THE INVENTION

A supercavitating underwater projectile can achieve speeds of 150 knots, and, therefore, it is especially useful in naval applications. A supercavitating underwater projectile achieves these speeds because it comprises a special tip on its nose known as a "cavitator." As the projectile travels through the water, the cavitator contacts the water in such as way as to create many small air bubbles. The small air bubbles then coalesce into one big air bubble that is large enough to completely encompass the projectile. The effect is that the projectile is traveling inside a giant air bubble that is itself moving through the water.

FIG. 1 depicts a side view of the salient components of supercavitating projectile 100 as known in the prior art inside cavity 103. Supercavitating projectile 100 comprises projectile body 101 and four prism-shaped fins 102-1, 102-2, 102-3, and 102-4 (not shown), which are equally spaced around body 101, and cavitator 103.

As projectile 100 travels through the water, there is a tendency for projectile 100 to swerve or fishtail, and the purpose of fins 102-1 through 102-4 is to keep projectile 100 completely inside air cavity 104. This minimizes the amount of projectile 100 which touches the water, which enables projectile 100 to go fast.

SUMMARY OF THE INVENTION

One disadvantage of supercavitating underwater projectiles in the prior art is that the prism-shaped fins tend to penetrate the air-water boundary of the air cavity, which increases the water drag on the projectile. Another disadvantage is that the position of the fins is fixed and does not adjust to changes in the shape of the cavity that are caused by changes in the speed of the projectile.

The present invention enables a supercavitating underwater projectile to stay within the air cavity without some of the costs and disadvantages for doing so in the prior art. For example, the illustrative embodiment provides bumpers which are roughly shaped like skis that face towards the air-water boundary of the air cavity. When the projectile fishtails and one or more of the bumpers come into contact with the air-water boundary, the water imparts torque and a rebounding force to push the projectile completely back into the air cavity. Furthermore, because the bumpers are shaped roughly like skis and not like knives, the bumpers do not penetrate the water or create unnecessary water drag.

Furthermore, the illustrative embodiment comprises an actuator for changing the positioning of the bumpers based on the speed of the projectile and a cavity-shape model.

The illustrative embodiment comprises: a projectile body capable of creating a air cavity inside water, wherein the air cavity is defined by a air-water boundary; and a first ski-shaped bumper connected to the projectile body, wherein the bottom of the first ski-shaped bumper faces the air-water boundary of the air cavity.

BRIEF DESCRIPTION OF THE DRAWINGS

FIGS. 2A and 2B depict left side and front views, respectively, of the salient components of supercavitating projectile 200 in accordance with the illustrative embodiment.

DETAILED DESCRIPTION

Figure 1:
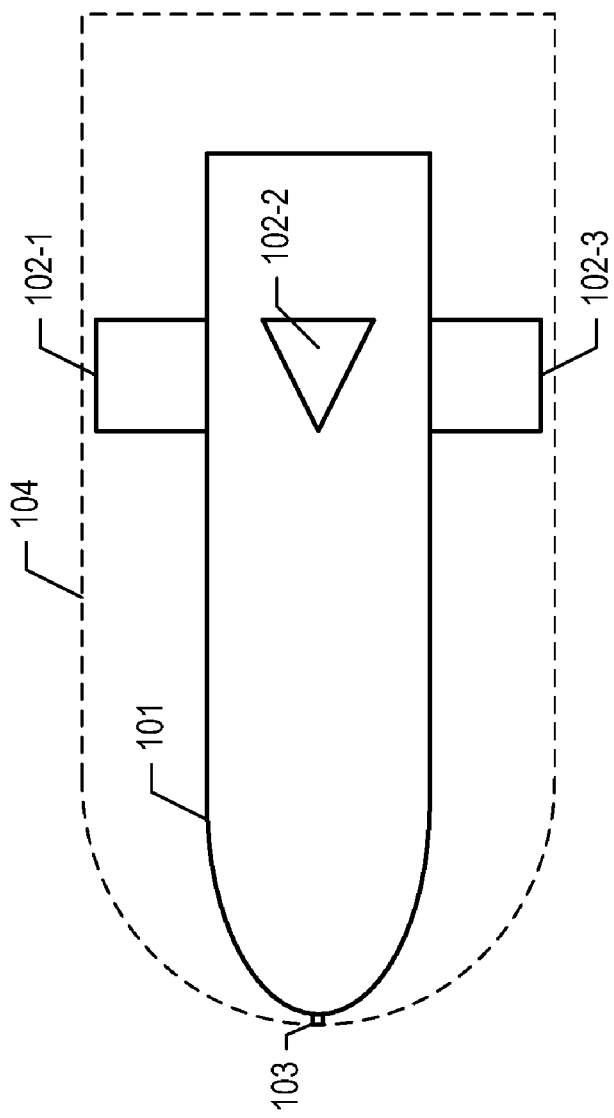
FIG. 1 depicts a side view of the salient components of supercavitating projectile 100 as known in the prior art inside cavity 103.
Figure 3B:
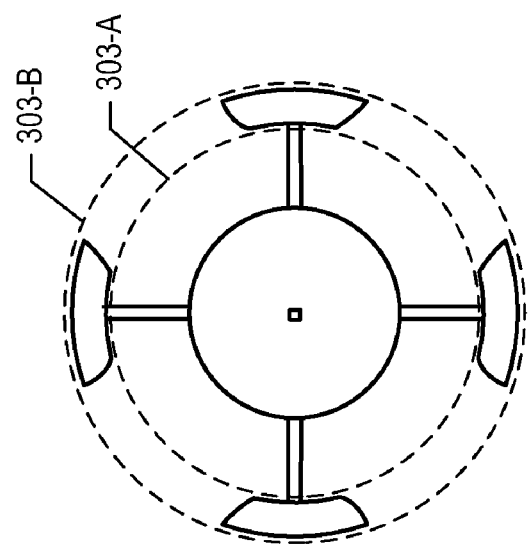
FIGS. 3A and 3B depicts left side and front views, respectively of the salient components of supercavitating projectile 200 with respect to elliptic paraboloid 301 and frustum 302 of elliptic paraboloid 301.
Figure 3A:
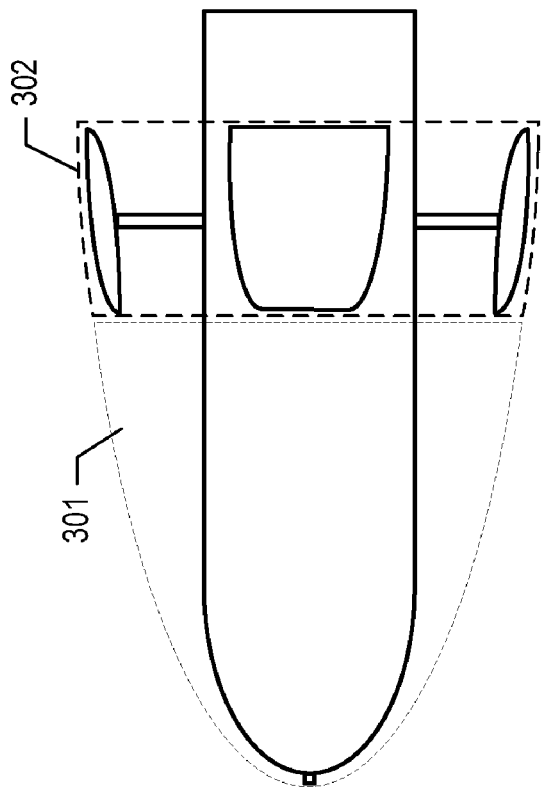
Figure 4:
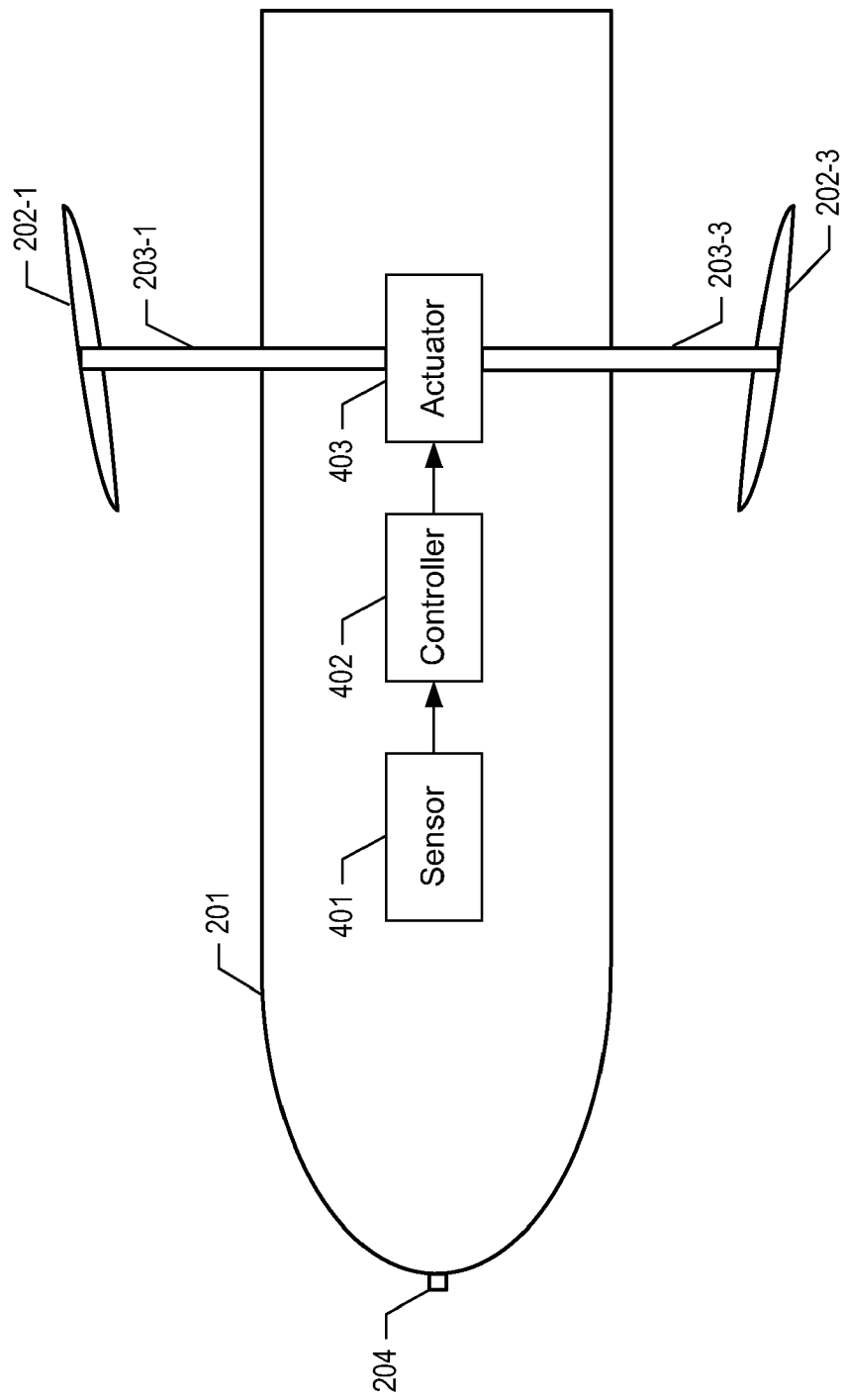
FIG. 4 depicts a cut-away view, along line A-A in FIG. 2B, of the salient components of supercavitating projectile 200.
Figure 5:
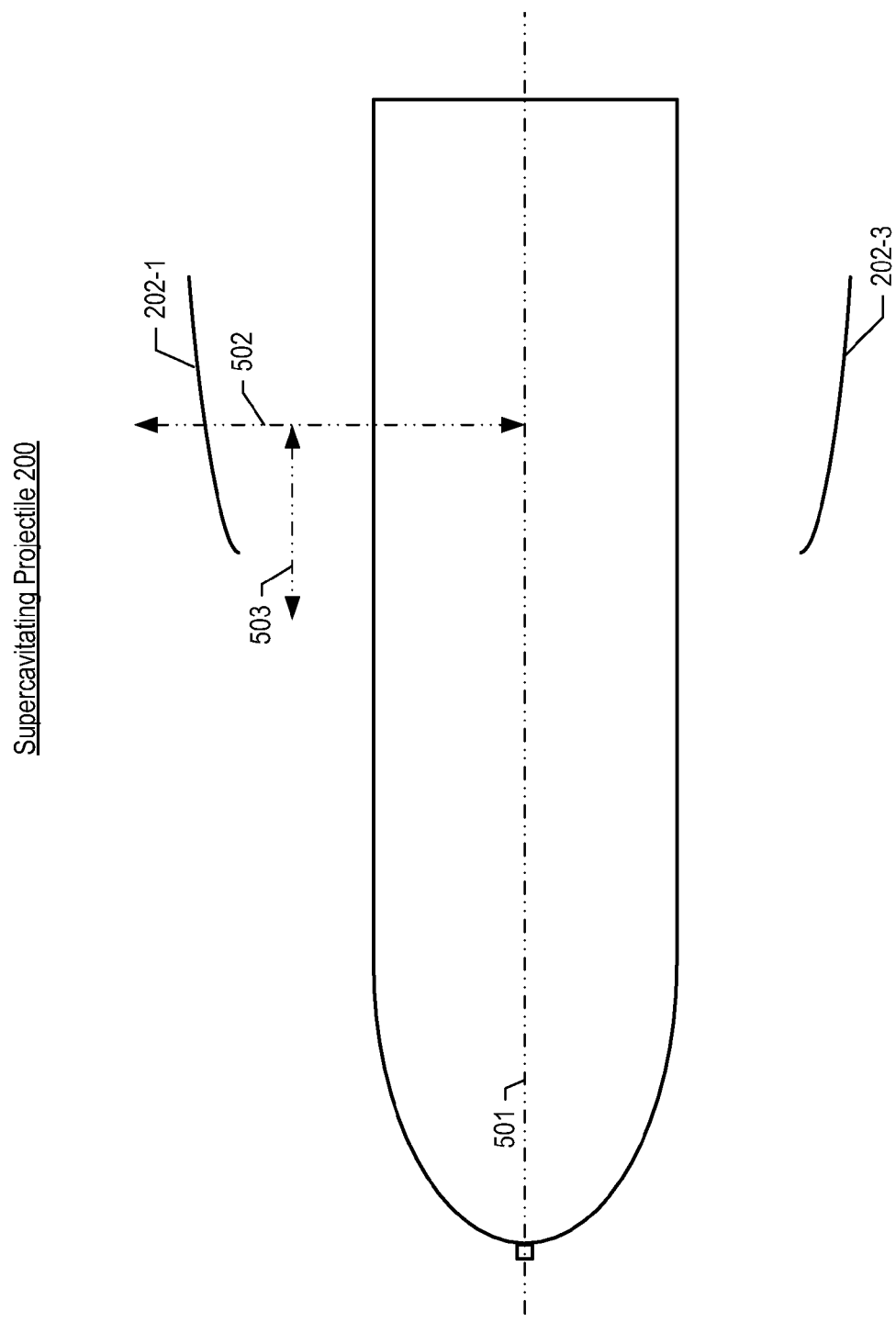
FIG. 5 depicts longitudinal axis 501 of supercavitating projectile 200 and line 502, which is perpendicular to longitudinal axis 501.

FIGS. 2A and 2B depict left side and front views, respectively, of the salient components of supercavitating projectile 200 in accordance with the illustrative embodiment. FIGS. 3A and 3B depicts left side and front views, respectively of the salient components of supercavitating projectile 200 with respect to elliptic paraboloid 301 and frustum 302 of elliptic paraboloid 301. FIG. 4 depicts a cut-away view, along line A-A in FIG. 2B, of the salient components of supercavitating projectile 200. FIG. 5 depicts longitudinal axis 501 of supercavitating projectile 200 and line 502, which is perpendicular to longitudinal axis 501.

Supercavitating projectile 200 comprises: projectile body 201, bumpers 202-1 through 202-4, bumper struts, 203-1 through 203-4, cavitator 204, sensor 401, controller 402, and actuator 403.

Although supercavitating projectile 200 comprises four bumpers and four struts, it will be clear to those skilled in the art, after reading this disclosure, how to make and use alternative embodiments of the present invention which comprise any number of bumpers and struts.

Projectile body 201 is a non-explosive, propelled object, such as a bullet, for imparting kinetic energy to a target. It will be clear to those skilled in the art, after reading this disclosure, how to make and use alternative embodiments of the present invention in which projectile body 201 is an explosive object. Furthermore, it will be clear to those skilled in the art, after reading this disclosure, how to make and use alternative embodiments of the present invention in which projectile body 201 is a self-propelled object, such as a missile, rocket, or torpedo.

Bumper 202-$i$, wherein i∈{1, 2, 3, 4}, is a ski-shaped structure for keeping projectile body 201 within air cavity 205 and minimize the projectiles yaw angle relative to its trajectory. The purpose of bumper 202-$i$ is to generate torque and rebounding forces when projectile body 201 fishtails and bumper 202-$i$ contacts the air-water boundary of air cavity 205.

The sum of the outer surfaces of bumpers 202-1 through 202-4 are shaped so as to suggest a frustum 302 of elliptic paraboloid 301, as depicted in FIGS. 3A and 3B, which frustum is designed to conform to the shape of air cavity 205. The vertex of the elliptical paraboloid is coincident with cavitator 204. It will be clear to those skilled in the art, after reading this disclosure, how to make and use alternative embodiments of the present invention in which the bumpers suggest another shape, such as for example, and without limitation, a frustum of a conic section, a box, a pyramid, sphere, or polyhedron. The parabolic shape of bumper 202-$i$ is intended to present a low-drag surface to the air-water boundary of air cavity 204, in contrast to the high-drag surface of the bumpers in the prior art. In accordance with the illustrative embodiment, the shape and orientation of bumper 202-$i$ is such that bumper 202-$i$ has more surface area facing in parallel with line 502 than perpendicularly to the line (i.e., in parallel with line 503) as depicted in FIG. 5.

Strut 203-$i$ is a rigid member that structurally connects bumper 202-$i$ to actuator 403 within projectile body 201. It will be clear to those skilled in the art, how to make and use strut 203-$i$.

Cavitator 204 is a tip, as is well-known in the prior art, on the nose of projectile body 201 that contacts the water in front of supercavitating projectile 200 in such as way as to create many small air bubbles. The small air bubbles then coalesce into one big air bubble that is large enough to completely encompass the supercavitating projectile 200. It will be clear to those skilled in the art how to make and use cavitator 204.

Sensor 401 is a mechanism for detecting the speed of supercavitating projectile 200 through the water and for transmitting an indication of that speed to controller 402. It will be clear to those skilled in the art how to make and use controller 402.

Controller 402 is electronics for estimating the shape of air cavity 205 based on the speed measurement from sensor 401 and for controlling actuator 403 to position bumpers 202-1 through 202-4 so that they are in the correct position with respect to the air-water boundary of air cavity 204. To do this, controller 402 uses a cavity-shape model based on the speed with which supercavitating projectile 200 is moving through the water. For example, when controller 402 determines that air cavity 205 is expanding, controller 402 directs actuator 403 to extend bumpers 202-1 through 202-4, but when controller 402 determines that air cavity 205 is contracting, controller 402 directs actuator 403 to retract bumpers 202-1 through 204-4.

Actuator 403 is a mechanism for extending and retracting bumpers 202-1 through 202-4 under the direction of controller 402. It will be clear to those skilled in the art how to make and use actuator 204.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A projectile comprising:
   a body;
   a cavitator connected to the body, wherein the cavitator produces an air cavity when the projectile travels through a water medium so that the projectile substantially fits within the cavity, wherein the cavity has an air/water boundary; and
   a first bumper connected to the body, wherein the first bumper comprises a surface that is shaped and arranged to cause the projectile to rebound from the air/water boundary when the surface contacts the air/water boundary.

2. The projectile of claim 1 further comprising:
   a sensor that senses a speed of the projectile;
   a controller that estimates a shape of the cavity produced by the cavitator based on input from the sensor.

3. The projectile of claim 2 further comprising an actuator that extends or retracts the first bumper responsive to a command from the controller.

4. The projectile of claim 1 further comprising three additional bumpers for a total of four bumpers, wherein the three additional bumpers are shaped and arranged to cause the projectile to rebound from the air/water boundary when any one of the three additional bumpers contacts the air/water boundary.

5. The projectile of claim 4 wherein an outer surface of each of the bumpers has a shape that, when all such bumpers are considered collectively, defines a frustum of an elliptical paraboloid.

6. A projectile comprising:
   a body;
   a cavitator connected to the body, wherein the cavitator produces an air cavity when the projectile travels through water so that the projectile substantially fits within the cavity, wherein the cavity has an air/water boundary; and
   a plurality of bumpers connected to the body, wherein each bumper of the plurality thereof is shaped and arranged to cause the projectile to rebound from the air/water boundary upon contact of one or more of the bumpers with the air/water boundary.

7. The projectile of claim 6 further comprising:
   a sensor that senses a speed of the projectile;
   a controller that estimates a shape of the cavity produced by the cavitator based on input from the sensor.

8. The projectile of claim 7 further comprising at least one actuator that extends or retracts each bumper responsive to a command from the controller.

9. The projectile of claim 6 further comprising at least one actuator that extends or retracts each bumper.

10. The projectile of claim 9 further comprising a controller that transmits a command to the at least one actuator, wherein the command directs the bumpers to retract when it is determined that the air cavity is contracting.

11. The projectile of claim 9 further comprising a controller that transmits a command to the at least one actuator, wherein the command directs the bumpers to extend when it is determined that the air cavity is expanding.

12. The projectile of claim 6 wherein, upon contact of one of the bumpers with the air/water boundary, a first surface of the bumper contacts the air/water boundary and that first surface has more surface area than a second surface that is oriented substantially normal to the first surface.

13. The projectile of claim 6 wherein an outer surface of each of the bumpers has a shape that, when all such bumpers are considered collectively, defines a frustum of an elliptical paraboloid.

14. A projectile comprising:
   a body;
   a cavitator connected to the body, wherein the cavitator produces an air cavity when the projectile travels through water so that the projectile substantially fits within the cavity, wherein the cavity has an air/water boundary; and
   a plurality of bumpers connected to the body, wherein:
   (a) each bumper of the plurality thereof comprises a surface that is shaped and arranged to cause the projectile to rebound from the air/water boundary when the surface contacts the air/water boundary; and
   (b) at least one actuator that extends or retracts each bumper.

15. The projectile of claim 14 further comprising a controller, wherein the controller transmits a command to the at least one actuator, wherein the command directs the at least one actuator to extend or retract the bumpers.

16. The projectile of claim 15 further comprising a sensor that senses a speed of the projectile, wherein the sensor transmits, to the controller, data relating to the sensed speed of projectile.

17. The projectile of claim 16 wherein the controller determines whether the air cavity is expanding or contracting based on the data relating to the sensed speed of the projectile.

18. The projectile of claim 17 wherein the controller directs the actuator to extend the bumpers when it is determined that the cavity is expanding.

19. The projectile of claim 17 wherein the controller directs the actuator to retract the bumpers when it is determined that the cavity is contracting.

\* \* \* \* \*